United States Patent
Hu

(10) Patent No.: US 8,070,124 B2
(45) Date of Patent: Dec. 6, 2011

(54) SUPPORTING STAND WITH HEAT DISSIPATION DEVICE

(75) Inventor: Rui-Bin Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 170 days.

(21) Appl. No.: 12/537,207

(22) Filed: Aug. 6, 2009

(65) Prior Publication Data

US 2010/0133397 A1  Jun. 3, 2010

(30) Foreign Application Priority Data

Dec. 3, 2008  (CN) .......................... 2008 1 0305941

(51) Int. Cl.
*A47B 91/00* (2006.01)
*A47G 29/00* (2006.01)
(52) U.S. Cl. ................ 248/346.5; 248/346.01; 248/676; 248/678; 248/918; 361/687; 361/695

(58) Field of Classification Search ............. 248/346.01, 248/346.03, 454, 676, 678, 346.05; 361/679.01, 361/687, 695, 676
See application file for complete search history.

(56) References Cited

U.S. PATENT DOCUMENTS

| | | | | |
|---|---|---|---|---|
| 4,624,433 A | * | 11/1986 | Henneberg | 248/346.06 |
| 5,704,212 A | * | 1/1998 | Erler et al. | 62/3.2 |
| 6,707,668 B2 | * | 3/2004 | Huang | 361/679.48 |
| RE42,054 E | * | 1/2011 | Park et al. | D14/447 |
| 7,881,053 B1 | * | 2/2011 | Huang | 361/679.48 |
| 2005/0083650 A1 | * | 4/2005 | Yang | 361/687 |
| 2009/0034188 A1 | * | 2/2009 | Sween et al. | 361/687 |

* cited by examiner

*Primary Examiner* — Amy J Sterling
(74) *Attorney, Agent, or Firm* — Altis Law Group, Inc.

(57) ABSTRACT

A supporting stand for a portable device includes a base portion, a supporting portion, at least one heat dissipation device and a platform. The supporting portion extends upwardly from the base portion. The at least one heat dissipation device is fastened on the supporting portion. The platform obliquely connects between the supporting portion and the base portion for supporting the portable device.

5 Claims, 3 Drawing Sheets

SUPPORTING STAND WITH HEAT DISSIPATION DEVICE

BACKGROUND

1. Technical Field

The present disclosure relates to portable devices, and more particularly to a supporting stand for a portable device.

2. Description of Related Art

Nowadays, portable devices, such as laptop computers, are popular. As the portable devices succumb to miniaturization and more functionality, the integrated circuits (ICs), such as CPUs, have become more complex.

However, with this complexity more heat is produced and the compact internal spaces of the portable device are not enough to maintain sufficient airflow by conventional convection means.

Therefore, a heat dissipation device for a portable device is desired.

DETAILED DESCRIPTION

Figure 1:
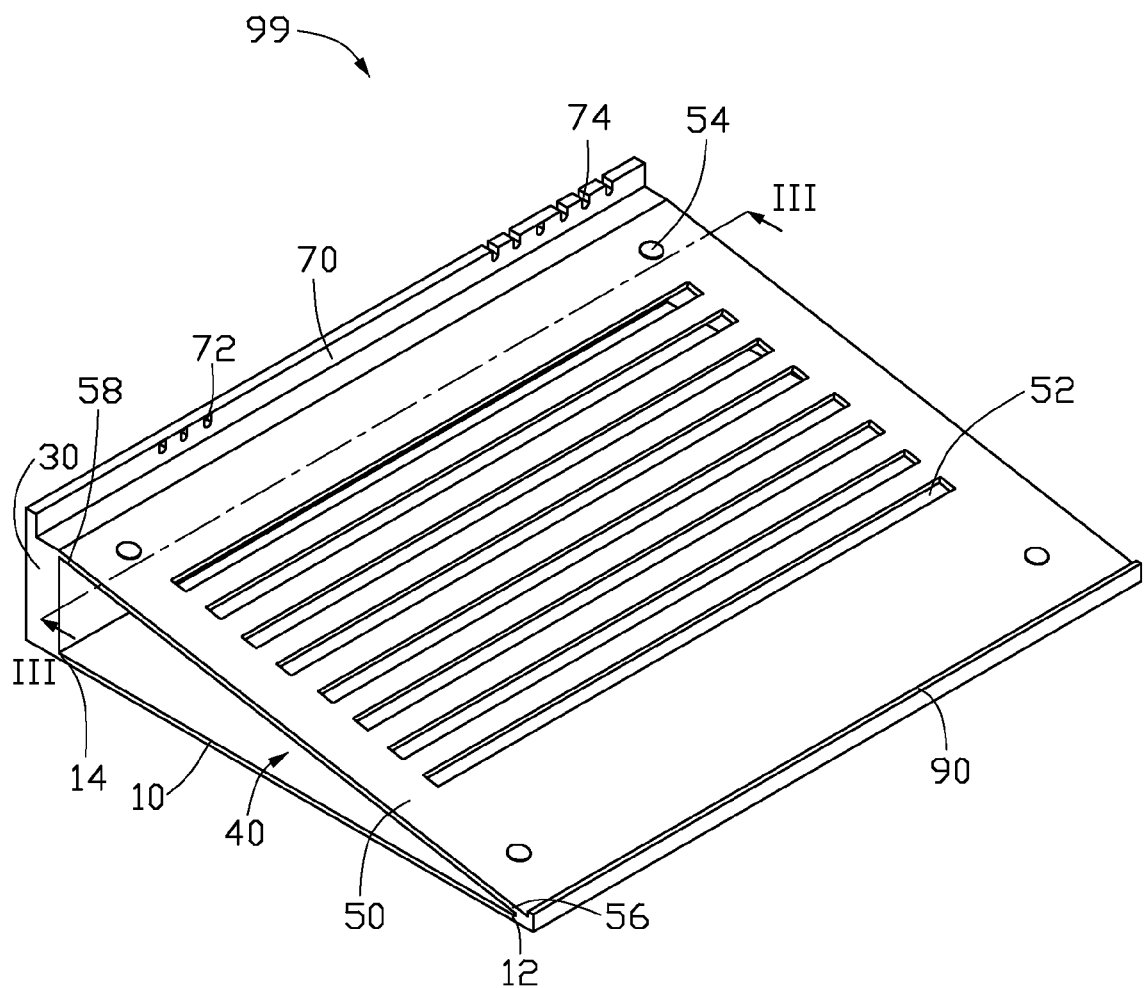
FIG. 1 is an isometric view of a supporting stand from one perspective in accordance with an exemplary embodiment.
Figure 2:
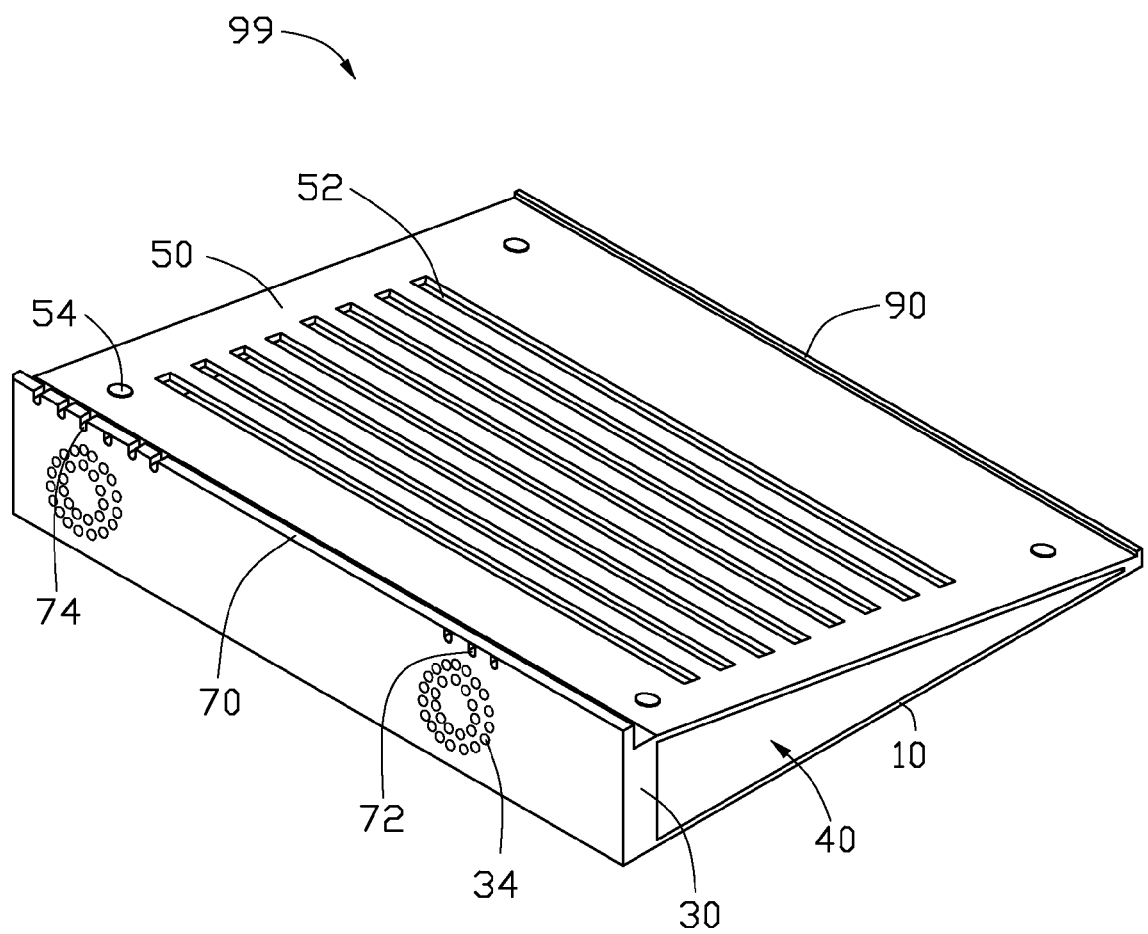
FIG. 2 is an isometric view of the supporting stand in FIG. 1 from another perspective.
Figure 3:
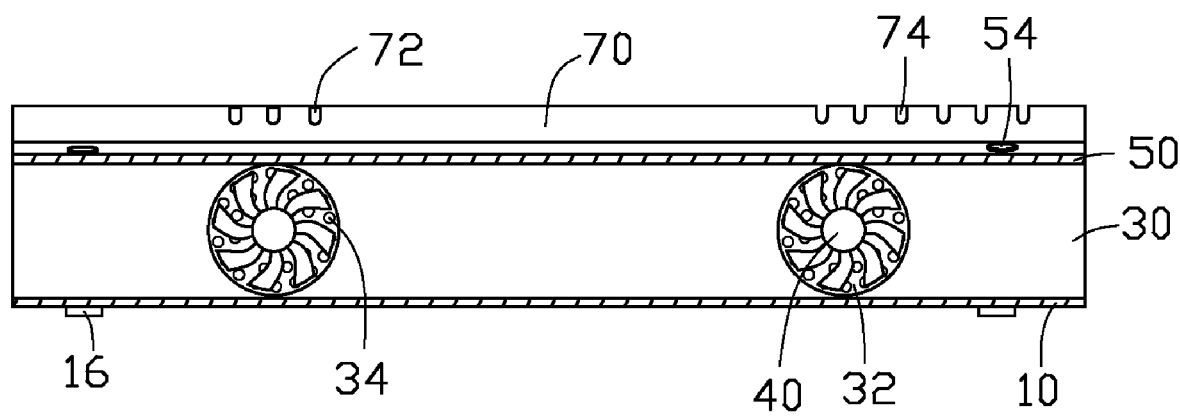
FIG. 3 is a cross-sectional view of the electronic device of FIG. 1 along the line.

Referring to FIGS. 1 to 3, a supporting stand 99 for supporting a portable device, such as a notebook computer, includes a base portion 10, a supporting portion 30, two heat dissipation devices 40, a platform 50, a rack 70, and a ledge 90.

The base portion 10 may be a rectangular board. The base portion 10 has a first end 12 and a second end 14 on another side of the base portion 10 opposite to the first end 12. Four anti-skid feet 16 protrude downwardly from the base portion 10. The anti-skid feet 16 are arranged on the base portion 10 based on size and shape of the portable device. In this embodiment, the four anti-skid feet 16 are located at four corners of the base portion 10 correspondingly.

The supporting portion 30 may be a flat sheet. The supporting portion 30 extends upwardly from the second end 14 of the base portion 10. The supporting portion 30 is substantially perpendicular to the base portion 10. The supporting portion 30 defines two cylindrical blind holes 32 in an inner surface of the supporting portion 30. The supporting portion 30 also defines a plurality of through holes 34 in the outer side of the supporting portion 30 communicating with the blind holes 32 correspondingly.

The two heat dissipation devices 40 are fastened on the supporting portion 30 and received in the two blind holes 32 correspondingly. The through holes 34 allow airflow to be blown in the heat dissipation devices 40 correspondingly. The heat dissipation devices 40 may be fans.

The platform 50 may be rectangular. The platform 50 has a lower end 56 and an upper end 58 on another side of the platform 50 opposite to the lower end 56. The lower end 56 connects to the first end 12 of the base portion 10. The upper end 58 connects to a top end of the supporting portion 30 opposite to the base portion 10. Therefore, the platform 50 obliquely connects between the base portion 10 and the supporting portion 30, and that cooperatively defines two triangular openings 40 therebetween to enhance heat dissipation of the portable device. Combination of the platform 50, the base portion 10 and the supporting portion 30 forms a triangular structure. The platform 50 defines a plurality of elongated openings 52 parallel to each other. Four anti-skid pads 54 protrude on the platform 50. The four anti-skid pads 54 may locate at four corners of the platform 50 and around the openings 52 correspondingly.

The rack 70 may be in bar shape, and extends upwards from the upper end 58 of the platform 50. The rack 70 defines a plurality of through holes 72 and U-shaped notches 74. The ledge 90 may be in bar shape, and extends upwards from the lower end 56 of the platform 50.

In use, the portable device may be supported on the platform 50 and placed between the rack 70 and the ledge 90. The portable device rests above the plurality of openings 52. When the heat dissipation devices 40 are activated, heat produced by the portable device is dissipated through the openings 52, therefore, lowering the risk of damages to the internal circuit and components of portable device due to overheating.

Furthermore, the anti-skid feet 16 prevent the supporting stand 99 from sliding on the support surface for the supporting stand 99. The anti-skid pads 54 prevent the portable device from sliding on the platform 50 and the ledge 90 prevent the portable device from sliding off the platform 50.

In addition, cables connected to the portable device can be inserted through the through holes 72 and the notches 74 to electrically connect with the portable device. When the cables are not in use, the cables can be disconnected from the portable device, and remained arranged in the through holes 72 and the notches 74, thus the cables are conveniently retrieved for future use.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A supporting stand for a portable device, comprising:
a base portion;
a supporting portion extending upwardly from the base portion,
a rack extending upwards from a top end of the supporting portion away from the base portion in a predetermined angle with respect to the platform, thereby preventing the portable device from sliding out of the platform;
at least one heat dissipation device fastened on the supporting portion; and
a platform obliquely connecting between the supporting portion and the base portion for supporting the portable device, wherein the base portion, the supporting portion, and the platform cooperatively define two triangular openings therebetween to enhance heat dissipation of the portable device.

2. The supporting stand according to claim 1, wherein the rack defines at least one through hole.

3. The supporting stand according to claim 1, wherein the rack defines at least one notch.

4. A supporting stand comprising:
a base board, wherein the base board comprises a first end and a second end opposite to the first end; the supporting board extends upwardly from the second end of the base board; the platform comprises a lower end and an upper end opposite to the lower end, the lower end connects to the first end of the base board; and the upper end connects to a top end of the supporting board away from the base board;

a supporting board extending from the base board;

a rack extending upwards from a top end of the supporting board away from the base board in a predetermined angle with respect to the platform, thereby preventing the portable device from sliding out of the platform; and the rack defines at least one through hole;

at least one fan fastened on the supporting board; and a platform connecting between the supporting board and the base board for supporting the portable device;

wherein the combination of the platform, the supporting board and the base board forms a triangular structure and two triangular openings therebetween to enhance heat dissipation of the portable device.

5. A supporting stand comprising:

a base board, wherein the base board comprises a first end and a second end opposite to the first end; the supporting board extends upwardly from the second end of the base board; the platform comprises a lower end and an upper end opposite to the lower end, the lower end connects to the first end of the base board; and the upper end connects to a top end of the supporting board away from the base board;

a supporting board extending from the base board;

a rack extending upwards from a top end of the supporting board away from the base board in a predetermined angle with respect to the platform, thereby preventing the portable device from sliding out of the platform; and the rack defines at least one notch;

at least one fan fastened on the supporting board; and a platform connecting between the supporting board and the base board for supporting the portable device;

wherein the combination of the platform, the supporting board and the base board forms a triangular structure and two triangular openings therebetween to enhance heat dissipation of the portable device.

* * * * *